United States Patent
Shih et al.

(10) Patent No.: US 10,691,114 B2
(45) Date of Patent: Jun. 23, 2020

(54) METHOD AND APPARATUS FOR DYNAMIC INTELLIGENT SCHEDULING

(71) Applicant: Industrial Technology Research Institute, Hsinchu (TW)

(72) Inventors: Pang-Min Shih, Hsinchu County (TW); Shan-Ming Chang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 147 days.

(21) Appl. No.: 15/989,219

(22) Filed: May 25, 2018

(65) Prior Publication Data
US 2019/0227533 A1    Jul. 25, 2019

(30) Foreign Application Priority Data
Jan. 19, 2018  (TW) .............................. 107101962 A (51) Int. Cl.
G05B 19/418    (2006.01)

(52) U.S. Cl.
CPC ............... *G05B 19/41865* (2013.01); *G05B 2219/32252* (2013.01); *G05B 2219/33034* (2013.01)

(58) Field of Classification Search
None
See application file for complete search history.

(56) References Cited

U.S. PATENT DOCUMENTS

| | | | |
|---|---|---|---|
| 5,432,887 A * | 7/1995 | Khaw | G06Q 10/06 706/19 |
| 6,615,093 B1 | 9/2003 | Chung et al. | |
| 6,687,563 B1 | 2/2004 | Wang et al. | |
| 6,980,873 B2 | 12/2005 | Shen | |
| 7,558,638 B2 | 7/2009 | Chang et al. | |

(Continued)

FOREIGN PATENT DOCUMENTS

| | | |
|---|---|---|
| CN | 101425159 | 5/2009 |
| CN | 101859100 | 10/2010 |

(Continued)

*Primary Examiner* — Kenneth M Lo
*Assistant Examiner* — Istiaque Ahmed
(74) *Attorney, Agent, or Firm* — JCIPRNET (57) ABSTRACT

A method for dynamic intelligent scheduling includes following steps: collecting and recording resource constraints of multiple schedules on a production line and decision data of changes made to the schedules by a scheduler; cross-enumerating schedule combinations by using multiple production goals as penalty conditions; establishing a mathematical model based on the resource constraints and multi-objective weights corresponding to each schedule combination and importing the resource constraints to calculate schedule results; recording the penalty condition corresponding to the schedule combination matching the decision data as a valid penalty; using values of parameters corresponding to the valid penalty and values of the penalty conditions respectively as inputs and outputs to train a learning model; and responding to a scheduling request, finding a weight of each schedule combination by using the learning model according to the resource constraint of the current schedule and the production goals, and generating a recommended schedule accordingly.

18 Claims, 4 Drawing Sheets

(56) References Cited

U.S. PATENT DOCUMENTS

| | | |
|---|---|---|
| 7,607,132 B2 | 10/2009 | Liu |
| 9,671,779 B2 | 6/2017 | Norman et al. |
| 2006/0106477 A1 | 5/2006 | Miyashita |
| 2011/0321051 A1* | 12/2011 | Rastogi ................. G06F 9/4881 718/102 |
| 2013/0066455 A1* | 3/2013 | Li ........................ G06Q 10/087 700/100 |
| 2017/0003677 A1 | 1/2017 | Hsu et al. |
| 2017/0227950 A1 | 8/2017 | Kinoshita et al. |
| 2017/0243135 A1 | 8/2017 | Ooba et al. |
| 2018/0113742 A1* | 4/2018 | Chung ................. G06F 9/5005 |

FOREIGN PATENT DOCUMENTS

| | | |
|---|---|---|
| CN | 102402716 | 4/2012 |
| CN | 103439886 | 12/2013 |
| CN | 105045243 | 11/2015 |
| TW | 201205474 | 2/2012 |

\* cited by examiner

METHOD AND APPARATUS FOR DYNAMIC INTELLIGENT SCHEDULING

CROSS-REFERENCE TO RELATED APPLICATION

This application claims the priority benefit of Taiwan application no. 107101962, filed on Jan. 19, 2018. The entirety of the above-mentioned patent application is hereby incorporated by reference herein and made a part of this specification.

TECHNICAL FIELD

The disclosure relates to a method and an apparatus for scheduling, and relates to a method and an apparatus for dynamic intelligent scheduling.

BACKGROUND

As time changes, industrial products are now produced to be small-volume and large-variety. In response, enterprises make initial planning at the production planning stage most of the time to satisfy the small-volume and large-variety requirement for production. Nevertheless, in the large-scale conventional industries or when producing innovative products, unexpected situations, such as machine failure, may occur during the production process. When unexpected situations happen, much experience in labor scheduling is required to perform production scheduling in a very short period of time.

Such production scheduling features: small-volume and large-variety production; large numbers of constraint conditions of scheduling, such as certain schedules being required to be continuous to prevent extra costs; excessively large numbers of selectable order pools; frequent occurrence of unexpected situations during production, such as machine failure, chemical composition problems found in half-finished products, etc.

It can thus be seen that enterprises may rely heavily on experienced employees and may frequently encounter the problem of excessive selectable order pools, and favorable updated schedules may not be determined in a short period of time as a result. These problems often lead to unnecessary costs and bring irreplaceable damage to enterprises.

SUMMARY

The disclosure provides a method for dynamic intelligent scheduling adapted for schedules of a plurality of machines on a production line generated dynamically by an electronic apparatus. The method for dynamic intelligent scheduling includes following steps: collecting and recording resource constraints of the schedules on the production line and decision data of changes made to the schedules by a scheduler to a decision history database; cross-enumerating a plurality of schedule combinations by using a plurality of production goals as penalty conditions; establishing a mathematical model based on the resource constrains and multi-objective weights corresponding to each of the schedule combinations and importing the resource constrains recorded in the decision history database into the mathematical model to calculate a schedule result; matching the schedule result with the decision data recorded in the decision history database to record a penalty condition corresponding to the matched schedule combination as a valid penalty; using values of parameters corresponding to the valid penalty and values of the penalty conditions respectively as inputs and outputs of a learning model to train the learning model; and in response to a scheduling request, finding a weight of each of the schedule combinations by using the learning model according to a resource constraint and a production goal of a current schedule, and generating a recommended schedule accordingly.

The disclosure further provides an apparatus for dynamic intelligent scheduling, and the apparatus for dynamic intelligent scheduling includes a data retrieving device, a storage device, and a processor. The storage device stores a plurality of commands and a decision history database. The processor is coupled to the data retrieving device and the storage device and is configured for loading and executing the commands stored in the storage device for: collecting and recording resource constraints of a plurality of schedules on the production line and decision data of changes made to the schedules by a scheduler to the decision history database by using the data retrieving device; cross-enumerating a plurality of schedule combinations by using a plurality of production goals as penalty conditions; establishing a mathematical model based on the resource constrains and multi-objective weights corresponding to each of the schedule combinations and importing the resource constrains recorded in the decision history database into the mathematical model to calculate a schedule result; matching the schedule result with the decision data recorded in the decision history database to record a penalty condition corresponding to the matched schedule combination as a valid penalty; using values of parameters corresponding to the valid penalty and values of the penalty conditions respectively as inputs and outputs of a learning model to train the learning model; and in response to a scheduling request, finding a weight of each of the schedule combinations by using the learning model according to a resource constraint and a production goal of a current schedule, and generating a recommended schedule accordingly.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the embodiments of the disclosure, a database is used to collect decision history data of schedulers and a mathematical model and a machine learning method are integrated such that when an unexpected machine condition occurs in the industrial production environment in which small-volume and large-variety production is required and costs of changing the production lines are high, an updated schedule may be generated immediately and applied to control the machine or notify factory personnel to change the schedule, thus facilitating or replacing original manpower of scheduler.

A method and an apparatus for dynamic intelligent scheduling are introduced herein in which schedules are dynamically generated corresponding to changes of production resources or goals through learning from decision of changes made to the schedules by a scheduler.

Figure 1:
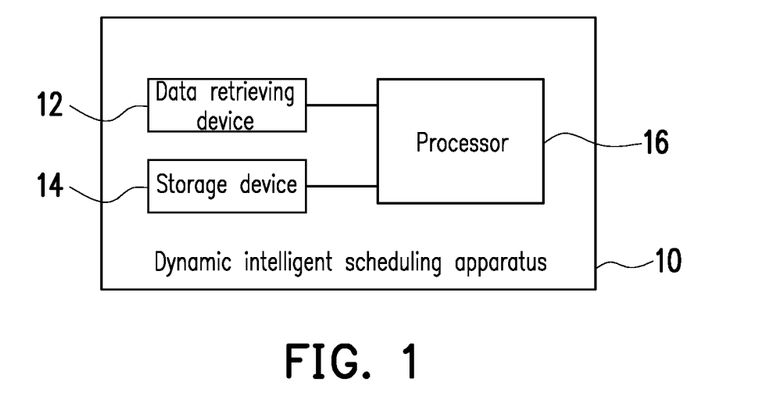
FIG. 1 illustrates a block view of a dynamic intelligent scheduling apparatus for according to an exemplary embodiment of the disclosure.

FIG. 1 illustrates a block view of a dynamic intelligent scheduling apparatus for according to an exemplary embodiment of the disclosure. With reference to FIG. 1, a dynamic intelligent scheduling apparatus 10 is, for example, a server, a workstation, a personal computer, or any other electronic apparatus having computing capability. The dynamic intelligent scheduling apparatus 10 includes, for example, a data retrieving device 12, a storage device 14, and a processor 16. Functions of the data retrieving device 12, the storage device 14, and the processor 16 are described as follows.

The data retrieving device 12 is an interface device such as a universal serial bus (USB) interface, a firewire interface, or a thunderbolt interface and may be configured to connect a control computer of each of the machines on a production line to retrieve data. In another embodiment, the data retrieving device 12 is, for example, a keyboard, a mouse, a touch panel, a touch screen, or any other input tool and is configured for detecting an input operation of the scheduler to retrieve input data. In still another embodiment, the data retrieving device 12 is, for example, a network card supporting wired network connection such as an ethernet network or a wireless network card supporting wireless communication standards such as the Institute of Electrical and Electronics Engineers (IEEE) 802.11n/b/g. The data retrieving device 12 may perform network connection with the control computer of each of the machines on the production line through wired or wireless connections and retrieves data.

The storage device 14 may any form of a fixed or movable random access memory (RAM), a read-only memory (ROM), a flash memory, any other similar device, or a combination of the foregoing devices. In this embodiment, the storage device 14 is configured for storing data retrieved by the data retrieving device 12 and recording computer instructions or programs which may be accessed and executed by the processor 16.

The processor 16 may be, for example, a central processing unit (CPU), a programmable microprocessor for general or special use, a digital signal processor (DSP), a programmable controller, an application specific integrated circuit (ASIC), a programmable logic device (PLD), any other similar device, or a combination of the foregoing devices. The processor 16 is connected to the data retrieving device 12 and the storage device 14 and may load the instructions from the storage device 14 to accordingly execute a method for dynamic intelligent scheduling provided by the embodiments of the disclosure. An embodiment is provided hereinafter to elaborate steps of this method in detail.

Figure 2:
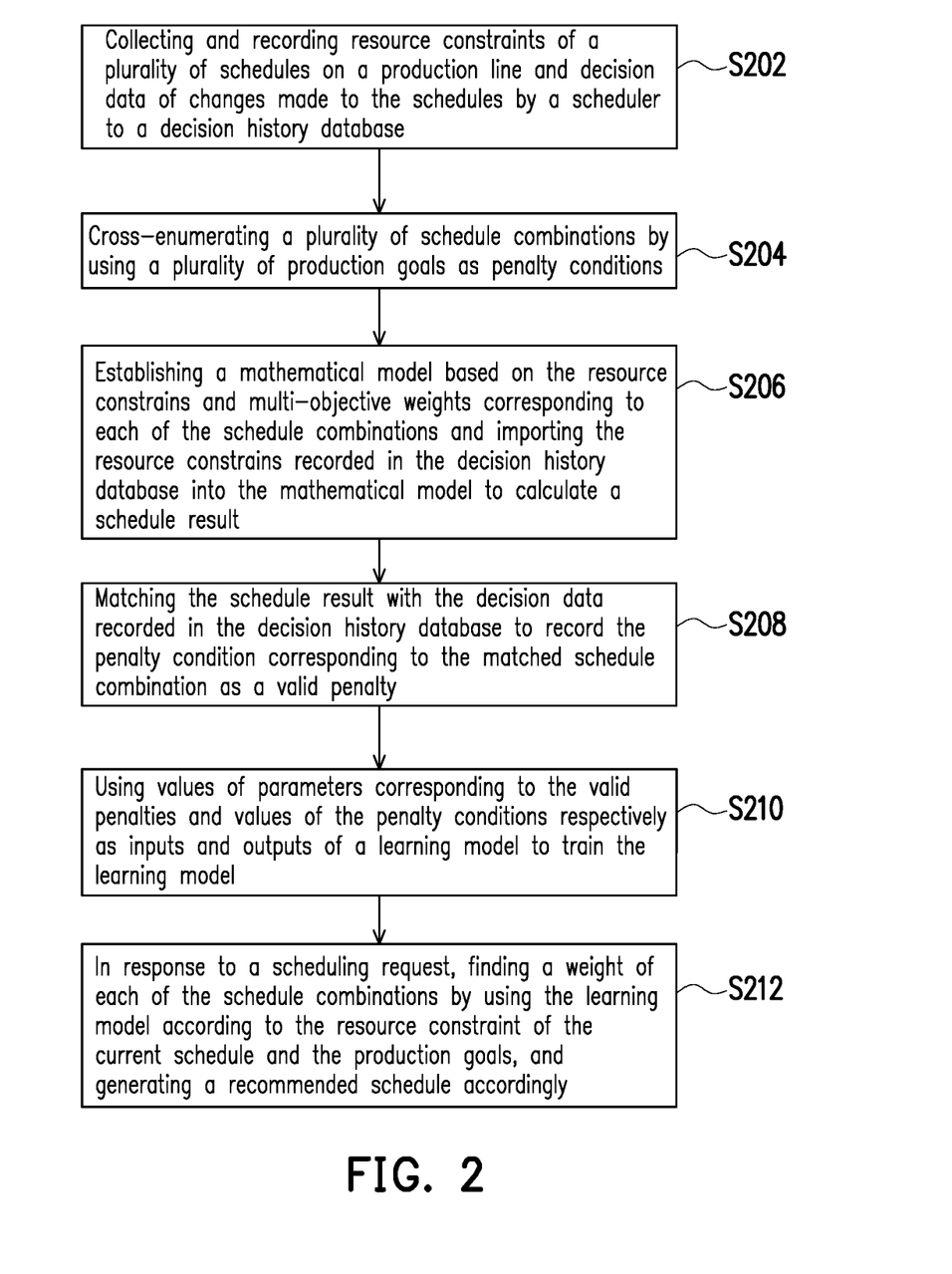
FIG. 2 illustrates a flow chart of a method for dynamic intelligent scheduling according to an exemplary embodiment of the disclosure.

FIG. 2 illustrates a flow chart of a method for dynamic intelligent scheduling according to an exemplary embodiment of the disclosure. With reference to FIG. 1 and FIG. 2 together, the method of this embodiment is adapted for the dynamic intelligent scheduling apparatus 10 of FIG. 1, and steps of the method for dynamic intelligent scheduling of the embodiments of the disclosure are described in detail with reference to devices of the dynamic intelligent scheduling apparatus 10.

In step S202, the processor 16 uses the data retrieving device 12 to collect resource constraints of a plurality of schedules on a production line and decision data of changes made to the schedules by a scheduler and records the collected data to a decision history database in the storage device 14. The resource constraints of the schedules include, for example, a machine constraint, a material constraint, a size constraint, a time constraint, an order constraint, or any other constraint condition that may affect proceeding of the schedules.

In an embodiment, the processor 16 collects a production constraint of each of the schedules of all of the machines and uses the same as the resource constraint. In the production constraint, the machines on the production line are, for example, divided into three categories including a material supply unit, a manufacturing unit, and an integrating unit based on purposes. The material supply unit is configured for supplying a material for manufacturing a product, for example, pre-processing a plurality of types of raw materials to produce a material which may be processed by the manufacturing unit.

Taking the steel industry for example, the material supply unit is configured for supplying the molten iron for steel processing, and the steel is processed by heating the iron ore to remove impurities, for example. The manufacturing unit is configured to receive the material supplied by the material supply unit and perform processing such as adding trace elements (e.g., silicon, manganese, phosphorus, and carbon) to produce the molten iron which may meet requirements of a product. For instance, the manufacturing unit may manufacture the molten iron supplied by the material supply unit into an integrable material. The integrating unit is configured to receive the molten iron outputted by the manufacturing unit to turn the molten iron into a qualified component required by the product to be provided to the integrating unit and to be outputted as the product. The integrating unit may integrate the qualified molten iron manufactured by the manufacturing unit into steal. The processor 16, for example, sets the material supply unit, the manufacturing unit, and the integrating unit on each of the machines on the production line to be used as the production constraint.

Taking the spinning industry in the textile industry as an example, the material supply unit is used mainly for supplying the chemical raw material for spinning processing, such as the non-natural petrochemical material. The non-natural petrochemical material is then refined into a simple organic compound. A chemical synthesis method is used by the manufacturing unit to polymerize the simple organic compound to a polymer compound. For instance, terephthalic acid and ethylene glycol are directly esterified and are condensed into polyester fibers. The integrating unit is used to make the fibers produced by the manufacturing unit into yarn.

To sum up, the material supply unit provides an initial material for production, wherein the material may include an unprocessed raw material or a purified material. The manufacturing unit receives the material from the material supply unit to further process the material. Required elements may be added and polymers may be chemically synthesized to form the integrable material. The integrating unit receives the integrable material from the manufacturing unit, and integrates the integrable material into a half-finished product or a finished product.

In an embodiment, each of jobs arranged to be produced by each of the machines on the production line may be processed in an order of the material supply unit, the manufacturing unit, and the integrating unit. If one of the machines fails during a production process, the job originally scheduled to the machine may be transferred to another machine of a same type to continue the processing.

Figure 3A:
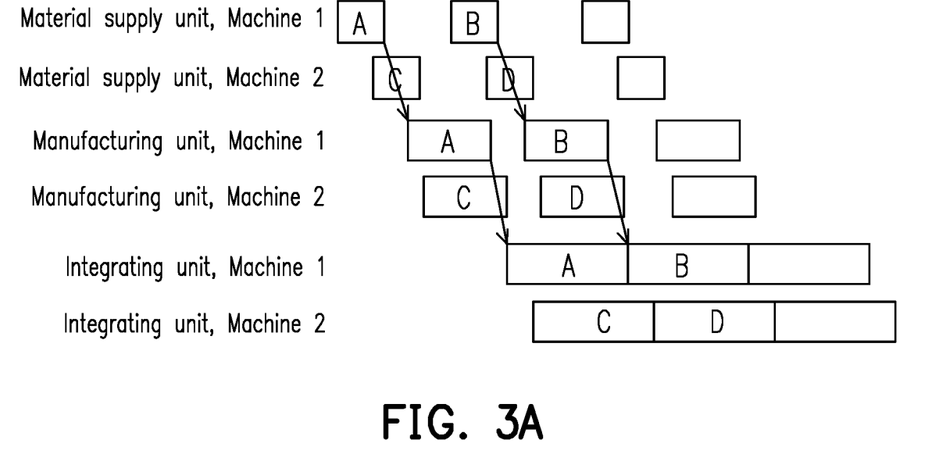
FIG. 3A and FIG. 3B illustrate examples of a method for dynamic intelligent scheduling according to an exemplary embodiment of the disclosure.
Figure 3B:
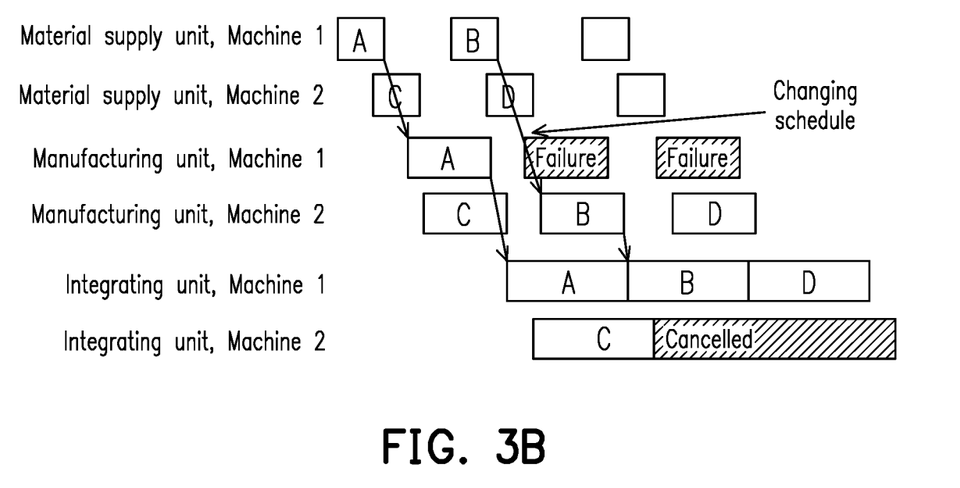

For instance, FIG. 3A and FIG. 3B illustrate examples of a method for dynamic intelligent scheduling according to an exemplary embodiment of the disclosure. With reference to FIG. 3A, a machine 1 and a machine 2 acting as the material supply units are respectively arranged to process jobs A and B and jobs C and D. After the jobs A and B are processed by the machine 1 acting as the material supply unit, the produced material is transferred to a machine 1 acting as the manufacturing unit. A half-finished product processed by the machine 1 acting as the manufacturing unit is transferred to a machine 1 acting as the integrating unit 1 to continue the processing. Similarly, after the jobs C and D are processed by the machine 2 acting as the material supply unit, the produced material is transferred to a machine 2 acting as the manufacturing unit to continue the processing. A half-finished product processed by the machine 2 acting as the manufacturing unit 2 is transferred to a machine 2 acting as the integrating unit to continue the processing.

With reference to FIG. 3B, if a failure occurs right after the job A is processed by the machine 1 acting as the manufacturing unit, the job B originally scheduled to be processed by the machine 1 acting as the manufacturing unit is re-scheduled and is changed to be processed by the machine 2 acting as the manufacturing unit. Accordingly, the job D originally scheduled to be processed by the machine 2 acting as the manufacturing unit is postponed as the job B is temporally inserted. At this time, the job D originally scheduled to be processed by the machine 2 acting as the integrating unit is canceled as the job D is postponed, and the machine 1 acting as the integrating unit is used instead to continue the processing of the job D after the job B is processed by the machine 2 acting as the manufacturing unit.

In an embodiment, the size constraint refers to a constraint that size differences among products processed on the same machine cannot be too big, meaning that the size differences are limited to be less than a particular value.

In an embodiment, the time constraint is a number of jobs capable of being processed within a scheduled time of each of the schedules over a period of time. For instance, if the material supply unit requires X hours for one time of processing and a schedule with Y hours is determined, Y/X jobs may thus be arranged. In another embodiment, the time constraint is used to limit a sum of start time of production by the material supply units, and the schedule with a lower sum of start time is selected. Taking the embodiment of FIG. 3A for example, if the machines 1 and 2 acting as the material supply units begin production respectively at 9:00 and 9:10 in the morning, the sum of start time is 18 hours and 10 minutes. If this sum of start time is lower than the sums of start time of other schedules, this schedule may be selected for production. In still another embodiment, in the machine 1 acting as the material supply unit, a processing job A and a processing job B begin respectively at 9:00 and 9:50 in the morning, a sum of start time is 18 hours and 50 minutes. If this sum of start time is lower than the sums of start time of other schedules, this schedule may be selected for production. In yet another embodiment, the time constraint is used to, for example, limit a same production machine can process a single job at a time. That is, the jobs to be processed by the same machine do not overlap.

With reference to the flow chart of FIG. 2 again, in step S204, the processor 16 cross-enumerates a plurality of schedule combinations by using a plurality of production goals as penalty conditions. In step S206, a mathematical model is established by using the resource constrains and multi-objective weights corresponding to each of the schedule combinations as conditions and the resource constrains recorded in the decision history database are imported into the mathematical model to calculate a scheduling result. The production goals include, for example, order priority, mode changing priority, utilization maximization, uninterrupted production capacity, and the like. The mathematical model is, for example, a mixed integer linear programming (MILP) model, a mixed integer non-linear programming (MILP) model, a constraint programming (CP) model, or a hybrid model composed of the foregoing mathematical models, and a type of the mathematical model is not limited to the above.

In this embodiment, the production goals are combined with the multi-objective weights, and the mathematical model may be established as follows:

$$Y=W_1 \times (A_1 X_1 + b_1) + W_2 \times (A_2 X_2 + b_2) + W_3 \times (A_3 X_3 + b_3) + \ldots$$

$X_1$ to $X_3$ represent different production goals, each of $A_1$ to $A_3$ is a coefficient of each of the production goals, each of $b_1$ to $b_3$ is a bias of each of the production goals, each of $W_1$ to $W_3$ represent an accounted weight of each of the production goals, and Y is a total score of the schedule combination. In the mathematical model, a polynomial in one variable is taken as an example for description, but in other embodiments, a polynomial in two variables or any other mathematical formula may be used according to different characteristics of the production goals, which is not limited by the embodiment.

Taking the production goal of order priority for example, a formula for representing the production goal of order priority may be set as $W_1 \times \Sigma(A_1 X_1 + b_1)$, wherein $W_1, A_1, X_1$, and $b_1$ are all matrices. $A_1$ represents a scheduled delivery date of each of the orders, $X_1$ represent the order selected, $b_1$ represents a bias between the scheduled delivery date and an actual delivery date of the selected order. The scheduled delivery date of the order $A_1$ is multiplied by the selected order $X_1$ in each of the schedule combinations, and the bias $b_1$ between the scheduled delivery date and the actual delivery date is added, such that a resource constraint of the order is obtained. A sum of the resource constraints of all the orders is calculated and multiplied by a corresponding objective weight $W_1$, such that a formula $W_1 \times \Sigma(A_1 X_1 + b_1)$ representing the production goal of order priority in the mathematical model is thus generated.

In another aspect, taking the production goal of mode changing priority for example, a formula representing the production goal of mode changing priority may be set as $W_2 \times \Sigma_{n=1}^{m}(A_n X_n - A_{n-1} X_{n-1})$, wherein $W_2, A_n, A_{n-1}, X_n$, and $X_{n-1}$ are all matrices. Herein, $A_n$ and $A_{n-1}$ represent product sizes, $X_n$ and $X_{n-1}$ represent adjacent jobs, m represents a job number of an order to be processed by the machine, and $A_n X_n - A_{n-1} X_{n-1}$ represents a size difference between the adjacent jobs and thus may act as a resource constraint. A sum of the resource constraints of all the machines is calculated and multiplied by a corresponding objective weight $W_2$, such that a formula $W_2 \times \Sigma_{n=1}^{m}(A_n X_n - A_{n-1} X_{n-1})$ representing the production goal of mode changing priority in the mathematical model is generated.

In the embodiment, when the size difference between the adjacent jobs is excessively great, a penalty condition may be set to increase a proportion of the product size difference to an overall score. To be specific, after the product size difference $A_n X_n - A_{n-1} X_{n-1}$ between the adjacent jobs is calculated, the product size difference may be compared with a predetermined difference. If the product size difference is greater than the predetermined difference, the weight value (i.e., the value of $W_2$) of the corresponding objective weight configured to be multiplied by the sum of the resource constraints is increased.

With reference to the flow chart of FIG. 2 again, in step S208, the processor 16 matches the scheduling result with the decision data recorded in the decision history database to record the penalty condition corresponding to the matched schedule combination as a valid penalty. By comparing the schedule result calculated through the mathematical model with the decision actually made by the scheduler, the schedule combination matched with or close to the decision made by the scheduler may be found. The corresponding penalty condition may thus act as the valid penalty and may be configured to act as a parameter for subsequent learning.

Figure 4:
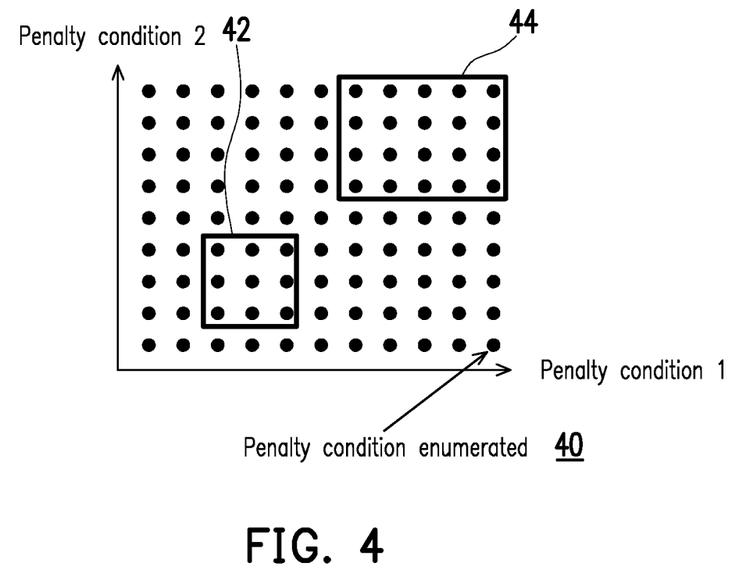
FIG. 4 illustrates an example of cross-enumerating schedule combinations by using a plurality of production goals as penalty conditions according to an exemplary embodiment of the disclosure.

For instance, FIG. 4 illustrates an example of cross-enumerating schedule combinations by using a plurality of production goals as penalty conditions according to an exemplary embodiment of the disclosure. In a schedule combination 40 illustrated in FIG. 4, a horizontal axis and a vertical axis represent different penalty conditions, and reference points in the schedule combination 40 represent a variety of combinations of the two penalty conditions (including the production goals and the objective weights). By comparing a schedule result calculated through the combinations with the decision actually made by the scheduler, the schedule combination matched with or close to the decision made by the scheduler may be found and set as the valid penalty. The reference points corresponding to the schedule combination determined to be the valid penalty may form a valid penalty region 42 and a valid penalty region 44 as shown in the drawings.

With reference to the flow chart of FIG. 2 again, in step S210, the processor 16 respectively uses values of parameters corresponding to the valid penalty and values of the penalty conditions as inputs and outputs of a learning model to train the learning model. The learning model is a learning model constructed by techniques such as the regression, decision tree, or neural network. The values of the parameters corresponding to the determined valid penalty act as the inputs of the learning model, and the values of the penalty conditions act as the outputs of the learning model, such that parameter values of each of layers in the learning model may be trained. Taking the neural network for example, a plurality of neural cells and linking are included between the input layer and the output layer, wherein a plurality of hidden layers may be included. A number of nodes (neural cells) in each of the layers is variable, and the nodes of a larger number may be used to enhance strength of the neural network.

Figure 5:
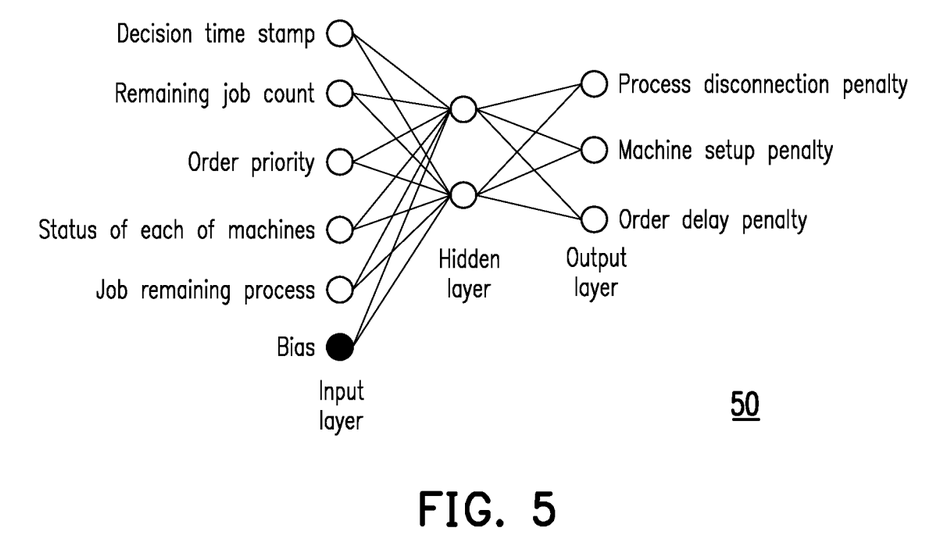
FIG. 5 illustrates a schematic diagram of machine learning of a neural network according to an exemplary embodiment of the disclosure.

For instance, FIG. 5 illustrates a schematic diagram of machine learning of a neural network according to an exemplary embodiment of the disclosure. A neural network 50 in FIG. 5 includes, for example, the input layer, the hidden layer, and the output layer. A plurality of nodes of the input layer are respectively set to be a decision time stamp, a remaining job count, a status of each of machines, a job remaining process, and a bias. A plurality of nodes of the output layer are respectively set to be a process disconnection penalty a machine setup penalty, and an order delay penalty. Data of each of the nodes is introduced to the neural network 50 for learning, and parameter values of neural cells in each layer may be calculated.

After the learning model is trained, in step S212, the processor 16 may thus respond to a scheduling request made by the production line, finds a weight of each of the schedule combinations by using the learning model according to the resource constraint of the current schedule and the production goals, and accordingly generates a recommended schedule. To be specific, the processor substitutes the weights found by using the learning model into the mathematical model, imports the resource constraint of each of the schedule combinations into the mathematical model to calculate the schedule results, and finally selects the recommended schedule matching a requirement from the schedule results.

The recommended schedule may be, for example, automatically transmitted to each of the machines on the production line to control the machines to change the schedules immediately. Alternatively, the recommended schedule may be sent to an operator of the machines on the production line by fax, e-mail, etc., and the operator may manually operate the machines to change the schedules.

In view of the foregoing, in the method and the apparatus for dynamic intelligent scheduling provided by the embodiments of the disclosure, the decision data recording decisions of the scheduler in response to various machine conditions is collected. The settings of the weights approximate to various types of the scheduling situations are found by using techniques such as the machine learning. Therefore, when an unexpected situation occurs on the production line, the schedule most suitable for such situation is automatically generated corresponding to the current resource constraints and the production goals, so as to provide assistance to the scheduler to make decision.

To sum up, in the method and the apparatus for dynamic intelligent scheduling provided by the embodiments of the disclosure, the problems of diversified scheduling and large amounts of constraints are solved based on the mathematical model. Moreover, through collecting the resource constraints of different schedules on the production line and decision data from the scheduler, the schedule most suitable for the current situation may thus be dynamically generated at any time according to the resource constraint and the production goal of the current schedule by finding the weight proportions among different goals in various scheduling situations by using the machine learning technique.

It will be apparent to those skilled in the art that various modifications and variations can be made to the disclosed embodiments. It is intended that the specification and examples be considered as exemplary, with a true scope of the disclosure being indicated by the following claims and their equivalents.

What is claimed is:

1. A method for dynamic intelligent scheduling, adapted for an electronic apparatus to dynamically generate schedules of a plurality of machines on a production line, the method comprising following steps:

collecting and recording resource constraints of the schedules on the production line and decision data of changes made to the schedules by a scheduler to a decision history database;

cross-enumerating a plurality of schedule combinations by using a plurality of production goals as penalty conditions;

establishing a mathematical model based on the resource constraints and multi-objective weights corresponding to each of the schedule combinations and importing the resource constraints recorded in the decision history database into the mathematical model to calculate a schedule result;

matching the schedule result with the decision data recorded in the decision history database to record a penalty condition corresponding to the matched schedule result as a valid penalty;

using values of parameters corresponding to the valid penalty and values of the penalty conditions respectively as inputs and outputs of a learning model to train the learning model; and in response to a scheduling request, finding a weight of each of the schedule combinations by using the learning model according to a resource constraint and a production goal of a current schedule, and generating a recommended schedule accordingly.

2. The method for dynamic intelligent scheduling as claimed in claim 1, wherein the step of collecting and recording the resource constraints of the schedules on the production line and the decision data of the changes made to the schedules by the scheduler to the decision history database comprises:

collecting a production constraint of each of the schedules of the machines to act as one of the resource constraints, the production constraint comprising:

setting up at least one material supply unit for supplying at least one material configured for manufacturing a product;

setting up at least one manufacturing unit configured for receiving the at least one material supplied by the at least one material supply unit and manufacturing the at least one material into at least one integrable material; and setting up at least one integrating unit configured for receiving the at least one integrable material outputted by the at least one manufacturing unit and integrating the at least one integrable material into a half-finished product or a finished product.

3. The method for dynamic intelligent scheduling as claimed in claim 2, wherein the production constraint further comprises a job number to be processed by the production machine within a scheduled time and a sum of start times of production of the at least one material supply unit or limiting the same production machine to process one single job at a same time.

4. The method for dynamic intelligent scheduling as claimed in claim 1, wherein the production goals comprise an order priority, and the step of establishing the mathematical model based on the resource constraints and the multi-objective weights corresponding to each of the schedule combinations comprises:

multiplying an order selected in each of the schedule combinations by a scheduled delivery date of the order and adding a variation of the scheduled delivery date and an actual delivery date to act as the resource constraint for a plurality of orders processed on the production line; and calculating a sum of the resource constraints of all the orders and multiplying the sum by a corresponding objective weight to act as a formula representing the production goal of order priority in the mathematical model.

5. The method for dynamic intelligent scheduling as claimed in claim 1, wherein the production goals comprise a mode changing priority and the step of establishing the mathematical model based on the resource constraints and the multi-objective weights corresponding to each of the schedule combinations comprises:

calculating a product size difference of adjacent jobs of a plurality of jobs processed by each of the machines to act as the resource constraint for the machines on the production line; and calculating a sum of the resource constraints of all the machines and multiplying the sum by the corresponding objective weight to act as a formula representing the production goal of mode changing priority in the mathematical model.

6. The method for dynamic intelligent scheduling as claimed in claim 5, wherein the step of calculating the product size difference of the adjacent jobs of the jobs processed by each of the machines to act as the resource constraint for the machines on the production line comprises:

comparing the product size difference with a predetermined difference and increasing a weight value of the objective weight corresponding to the sum configured for multiplying the resource constraint when the product size difference is greater than the predetermined difference.

7. The method for dynamic intelligent scheduling as claimed in claim 1, wherein the step of finding the weight of each of the schedule combinations by using the learning model and accordingly generating the recommended schedule comprises:

substituting the weight found by using the learning model into the mathematical model, importing the resource constraint of each of the schedule combinations into the mathematical model to calculate the schedule results, and selecting the recommended schedule matching a requirement from the schedule results.

8. The method for dynamic intelligent scheduling as claimed in claim 1, wherein the mathematical model is a mixed mathematical model composed of at least one programming model.

9. The method for dynamic intelligent scheduling as claimed in claim 1, wherein the mathematical model is a constraint programming (CP) model.

10. An apparatus for dynamic intelligent scheduling, comprising:

a data retrieving device;

a storage device, storing a plurality of commands and a decision history database; and a processor, coupled to the data retrieving device and the storage device and configured for loading and executing the commands stored in the storage device for:

collecting and recording resource constraints of a plurality of schedules on the production line and decision data of changes made to the schedules by a scheduler to the decision history database by using the data retrieving device;

cross-enumerating a plurality of schedule combinations by using a plurality of production goals as penalty conditions;

establishing a mathematical model based on the resource constraints and multi-objective weights corresponding to each of the schedule combinations and importing the resource constraints recorded in the decision history database into the mathematical model to calculate a schedule result;

matching the schedule result with the decision data recorded in the decision history database to record a penalty condition corresponding to the matched schedule result as a valid penalty;

using values of parameters corresponding to the valid penalty and values of the penalty condition respectively as an input and an output of a learning model to train the learning model; and in response to a scheduling request, finding a weight of each of the schedule combinations by using the learning model according to a resource constraint and a production goal of a current schedule, and generating a recommended schedule accordingly.

11. The apparatus for dynamic intelligent scheduling as claimed in claim 10, wherein the processor is configured for:

collecting a production constraint of each of the schedules of the machines to act as one of the resource constraints, the production constraint comprising:

setting up at least one material supply unit for supplying at least one material configured for manufacturing a product;

setting up at least one manufacturing unit configured for receiving the at least one material supplied by the at least one material supply unit and manufacturing the at least one material into at least one integrable material; and setting up at least one integrating unit configured for receiving the at least one integrable material outputted by the at least one manufacturing unit and integrating the at least one integrable material into a half-finished product or a finished product.

12. The apparatus for dynamic intelligent scheduling as claimed in claim 11, wherein the production constraint further comprises a job number to be processed by the production machine within a scheduled time and a sum of start times of production of the at least one material supply unit or limiting the same production machine to process one single job at a same time.

13. The apparatus for dynamic intelligent scheduling as claimed in claim 10, wherein the production goals comprise an order priority, and the processor is configured for multiplying an order selected in each of the schedule combinations by a scheduled delivery date of the order and adding a variation of the scheduled delivery date and an actual delivery date to act as the resource constraint for a plurality of orders processed on the production line and calculating a sum of the resource constraints of all the orders and multiplying the sum by a corresponding objective weight to act as a formula representing the production goal of order priority in the mathematical model.

14. The apparatus for dynamic intelligent scheduling as claimed in claim 10, wherein the production goals comprise a mode changing priority, and the processor is configured for calculating a product size difference of adjacent jobs of a plurality of jobs processed by each of the machines to act as the resource constraint for the machines on the production line and calculating a sum of the resource constraints of all the machines and multiplying the sum by the corresponding objective weight to act as a formula representing the production goal of mode changing priority in the mathematical model.

15. The apparatus for dynamic intelligent scheduling as claimed in claim 14, wherein the processor is further configured for comparing the product size difference with a predetermined difference and increasing a weight value of the objective weight corresponding to the sum configured for multiplying the resource constraint when the product size difference is greater than the predetermined difference.

16. The apparatus for dynamic intelligent scheduling as claimed in claim 10, wherein the processor is configured for substituting the weight found by using the learning model into the mathematical model, importing the resource constraint of each of the schedule combinations into the mathematical model to calculate the schedule results, and selecting the schedule combination corresponding to the schedule result with a lowest value as a recommended schedule.

17. The apparatus for dynamic intelligent scheduling as claimed in claim 10, wherein the mathematical model is a mixed mathematical model composed of at least one programming model.

18. The apparatus for dynamic intelligent scheduling as claimed in claim 10, wherein the mathematical model is a constraint programming model.

* * * * *